April 10, 1951        J. A. MASLIN        2,548,611

APPARATUS FOR FILLING AND WEIGHING CONTAINERS

Filed April 27, 1945        3 Sheets-Sheet 2

INVENTOR.
JOHN A. MASLIN
BY Joseph A. Ryan
ATTORNEY

April 10, 1951   J. A. MASLIN   2,548,611
APPARATUS FOR FILLING AND WEIGHING CONTAINERS
Filed April 27, 1945   3 Sheets-Sheet 3

INVENTOR.
JOHN A. MASLIN
BY Joseph A. Ryan
ATTORNEY

UNITED STATES PATENT OFFICE 2,548,611

APPARATUS FOR FILLING AND WEIGHING CONTAINERS

John A. Maslin, Claymont, Del., assignor to Allied Chemical & Dye Corporation, a corporation of New York Application April 27, 1945, Serial No. 590,663

3 Claims. (Cl. 226—19)

This invention relates to apparatus for filling and weighing containers particularly with dusty solid pulverulent materials.

Figure 1:
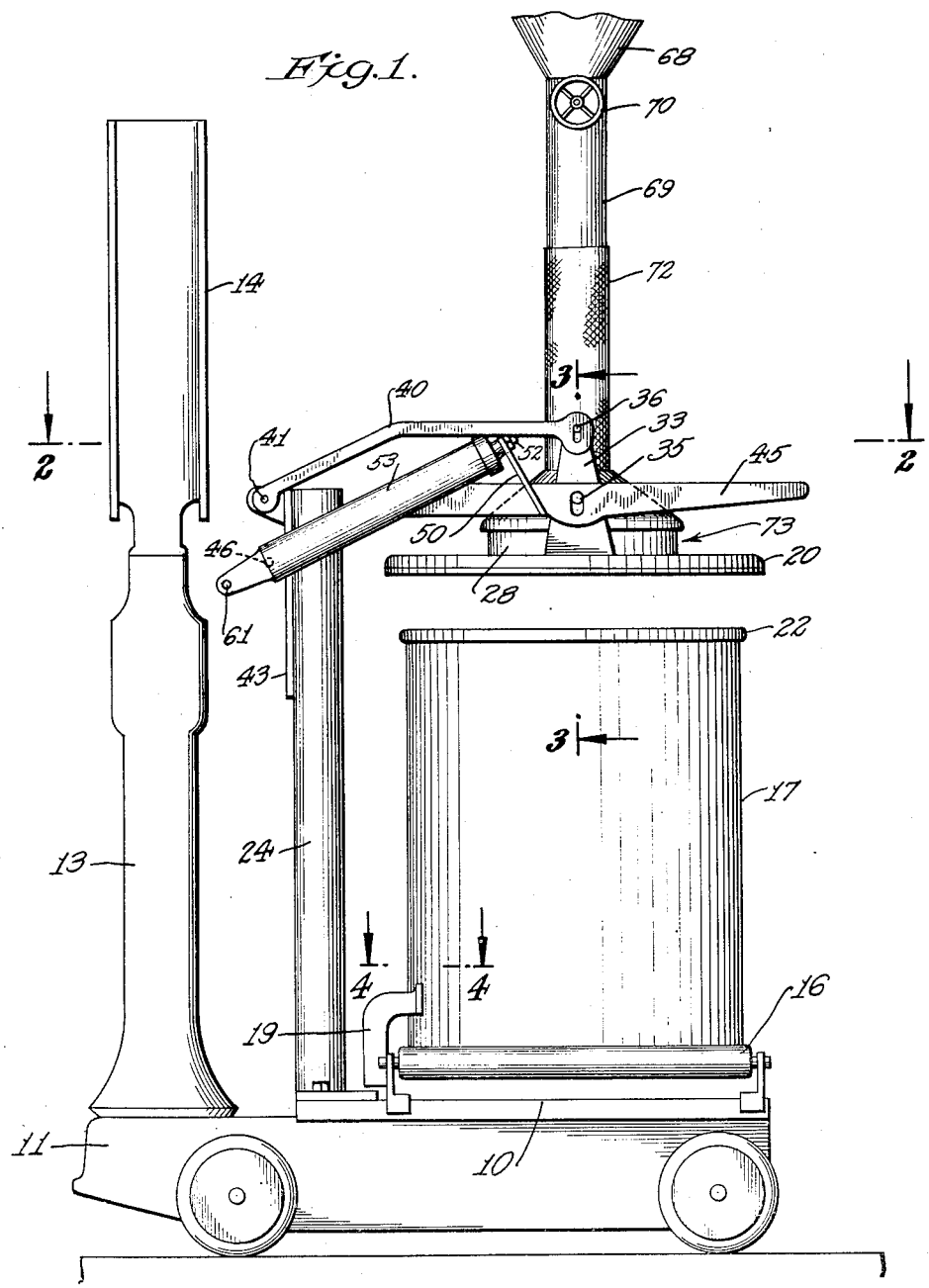
Figure 2:
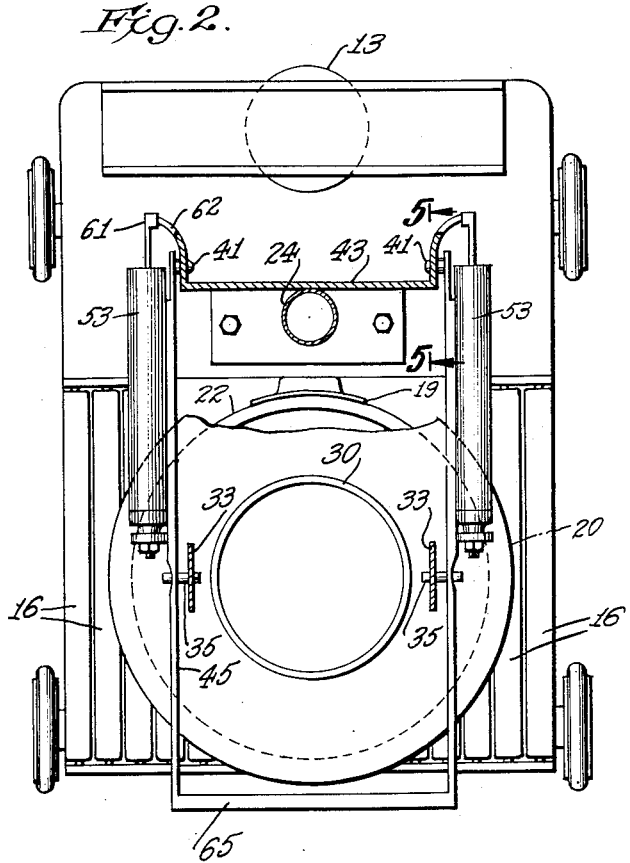
Figure 6:
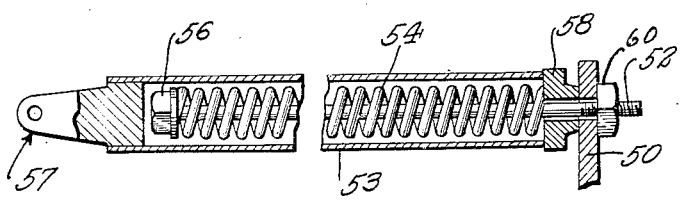
Figure 3:
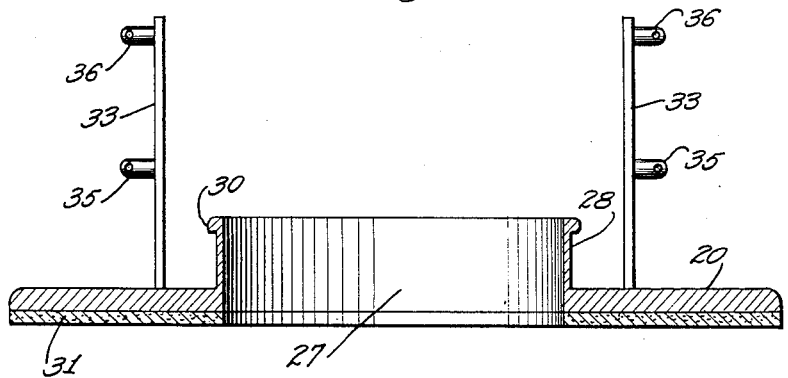
Figures 4, 5:
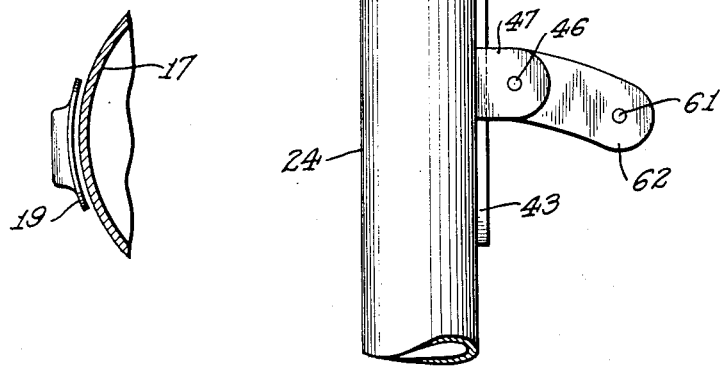

The invention, its objects and advantages will be apparent from the following description taken in connection with the accompanying drawings in which: Fig. 1 is a side elevation of a preferred embodiment of the improved apparatus; Fig. 2 is a top view taken approximately on line 2—2 of Fig. 1; Fig. 3 is a vertical section on the line 3—3 of Fig. 1; Fig. 4 is a horizontal section on the line 4—4 of Fig. 1; Fig. 5 is an enlarged partial elevation taken on the line 5—5 of Fig. 2, and Fig. 6 is a detail.

Referring to Fig. 1, a scale platform 10 is carried by a frame 11 and, by known weighing linkage not shown, is connected thru frame 11 and column 13 with the pointer of a scale dial 14. Mounted on the scale platform are conveyor rollers 16 by means of which a relatively heavy container or drum 17 may be conveniently rolled onto the scale for filling and weighing. An arcuate stop 19 fixed to the scale platform facilitates placing the drum coaxially beneath a circular hood 20 the diameter of which substantially exceeds the outside diameter of the upper rim 22 of the drum to be filled. A vertical post 24, securely bolted or otherwise attached at its lower end to the scale platform 10, constitutes a support for the hood suspension mechanism.

Hood 20, shown in vertical cross-section in Fig. 3, is provided with a central, circular opening 27 formed partly by a short cylindrical section 28 terminating at its upper end in an annular rim 30. Suitably attached to the underside of the hood is a layer of relatively soft fabric-like material 31 which, when hood 20 is in operative drum-filling position, directly contacts the upper rim of the drum and forms a dust-tight closure. Brackets 33 are welded at their lower ends to and extend upwardly from the top side of the hood, each bracket being provided with horizontal pins 35 and 36. As shown particularly in Fig. 1, pin 36 projects into the vertically elongated slot in the free end of guide arm 40 the opposite end of which is pivoted at 41 to a bracket 42 carried by a rigid steel plate 43 attached to the upper end of post 24 and lying in a vertical plane parallel with the face of the scale dial. Pin 35 projects into a similar vertically elongated slot in an operating arm 45, one end of which is pivoted at 46 to a bracket 47 fixed to plate 43.

A plate 50 is welded at its lower end to operating arm 45, and is provided at its upper end with a circular hole thru which extends the end of rod 52 of a spring assembly (Fig. 6) comprising a cylinder or housing 53 adapted to receive spring 54, and rod 52 having on its inner end a nut or suitable spring abutment 56. Threaded to one end of the cylinder is a cap 58 thru which rod 52 slidably projects, and the opposite end of the cylinder is closed off and provided with an attaching eye 57. It will be seen that this arrangement is such that expansion of the spring 54 draws rod 52 within the casing. The spring assembly is connected at one end to plate 50 by nut 60, and is pivoted at 61 to bracket 62 fixed to plate 43. It will be noted from an inspection of Figs. 1 and 2 that the guide arm 40, operating arm 45, plate 50 and the associated spring assembly are duplicated on either side of the hood, arms 45 being connected by a handle 65.

A supply hopper 68 and an outlet spout 69 are rigidly supported approximately in the position indicated in Fig. 1 by framework not shown. Spout 69 includes a valve 70 which regulates the flow of material out of the hopper. A conduit 72 made of flexible fabric is connected at its upper end to spout 69, and the lower end of the conduit is stretched over and forms a dust-tight connection with hood rim 30 as indicated at 73, Fig. 1.

From the foregoing description of hood 20 and the linkages by which the hood is suspended between the rigid hopper spout 69 and the top edge of a drum it will be seen that when the operating arm 45 is approximately in the position shown in Fig. 1, namely, so that spring pivot point 61, operating arm pivot point 46, and the axis of spring 54 are in alignment, the action of the spring is neutralized, and as far as the spring is concerned the hood and its supporting arms are in what may be considered as a neutral or balanced condition. If the operating arm 45 is raised appreciably, pivot points 61 and 46 and the axis of the spring get out of alignment, and the spring lifts and holds the hood, the associated suspending arms and flexible conduit 72 in a retracted or out-of-the-way position from the top of the drum. On the other hand, when a drum such as 17 is placed on the rollers 16 as shown in Fig. 1, and the operating arm 45 is lowered appreciably below the horizontal position and so that pivot points 61 and 46 and the axis of the spring are out of alignment, the spring forces the hood into dust-tight contact with the upper rim of the drum. Thus, the hood is held in contact with the drum rim by the weight of the hood and the associated arms plus the force exerted by spring 54. Valve 70 is then opened, and filling of the drum from hopper 68 is effected until the pointer on dial 14 indicates the proper amount of material in drum 17 at which time valve 70 is closed. Lifting of the arm 45 to a position slightly above the horizontal takes the hood away from the top of the drum, and the action of spring 54 holds the hood far enough away from the drum to facilitate ready removal of the same from rollers 16. Guide arms 40 prevent free rotation of the hood about pins 35 and make it unnecessary to manually guide the hood during its upward and downward movements. The slots in arms 40 and 45 afford a sufficiently non-rigid suspension of the hood to compensate for irregularities in the conformity of the rim of the drum being filled.

The apparatus described affords the advantage of being quickly and easily operated. Further since the hood, its suspension arms and the post 24 are mounted on and thus become part of the scale platform, there is no interference with the accurate registry by the pointer of dial 14 of the actual weight of material in the drum no matter what the weight of the hood and its supporting arms and no matter how great the action of spring 54 may be in holding the hood tightly against the rim of the barrel.

I claim:

1. Container filling and weighing apparatus comprising a weighing platform adapted to hold a container, a rigidly supported rim attached to said container and surrounding a filling opening, a hood adapted to contact said rim and cover said opening, means for feeding dusty solid material thru said hood, hood suspension means comprising a support carried by said weighing platform, an operating arm pivoted to said support and operable to raise and lower said hood, a guide arm pivoted to said support and adapted to maintain said hood relatively horizontal when said hood is adjacent said rim, a housing pivoted to said support and having a spring mounted therein, said spring being connected to said operating arm and adapted, when in axial alignment with the pivot points of said operating arm and said housing, to maintain said hood in a neutral position out of contact with said rim, and when out of such alignment, to hold said hood in dust-tight contact with said rim during filling of the container and to retain said hood in a retracted elevated position above said rim before and after filling of the container.

2. Container filling and weighing apparatus comprising a weighing platform adapted to hold a container having a rim fixed thereto and surrounding a filling opening, weight registry means connected to said platform, a hood adapted to contact said rim and cover said opening, means for feeding dusty solid material thru said hood; hood suspension means comprising a support carried by said platform, an operating arm pivoted to said support and connected to said hood and having neutral, container filling and retracted elevated positions; said suspension means acting self-operably after initial movement of said arm from neutral toward container filling position to continuously force said hood downwardly against said rim and toward said platform and acting self-operably after initial movement of said arm from neutral toward retracted position to retain said hood in retracted position before and after filling of said container, whereby said hood is held in dust-tight contact with said rim during filling of the container and whereby the weight of said hood and the weight and action of said suspension means effect no interference with weight registry.

3. Container filling and weighing apparatus comprising a weighing platform adapted to hold a container having a rim fixed thereto and surrounding a filling opening, weight registry means connected to said platform, a hood adapted to contact said rim and cover said opening, means for feeding dusty solid material thru said hood; hood suspension means comprising a support carried by said platform, an operating arm pivoted to said support and connected to said hood and having neutral, container filling and retracted elevated positions, a spring pivotally connected to said support and to said arm, said suspension means acting self-operably after initial movement of said arm from neutral toward container filling position to continuously force said hood downwardly against said rim and toward said platform and acting self-operably after initial movement of said arm from neutral toward retracted position to retain said hood in retracted position before and after filling of said container, whereby said hood is held in dust-tight contact with said rim during filling of the container and whereby the weight of said hood and the weight and action of said suspension means effect no interference with weight registry.

JOHN A. MASLIN.

REFERENCES CITED

The following references are of record in the file of this patent:

UNITED STATES PATENTS

| Number | Name | Date |
|---|---|---|
| 251,392 | Ward | Dec. 27, 1881 |
| 984,537 | Buschman | Feb. 21, 1911 |
| 1,211,348 | Polk | Jan. 2, 1917 |